Figure 2:
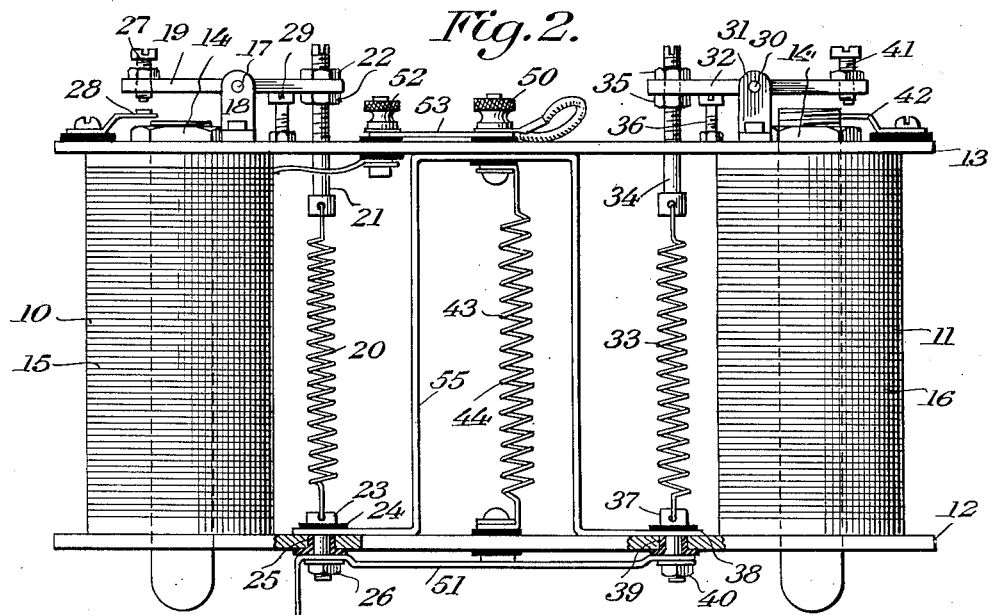

Nov. 10, 1936.  H. MITCHELL  2,060,743
APPARATUS FOR CONTROLLING THE CHARGE OF STORAGE BATTERIES
Filed Nov. 5, 1934    2 Sheets-Sheet 1
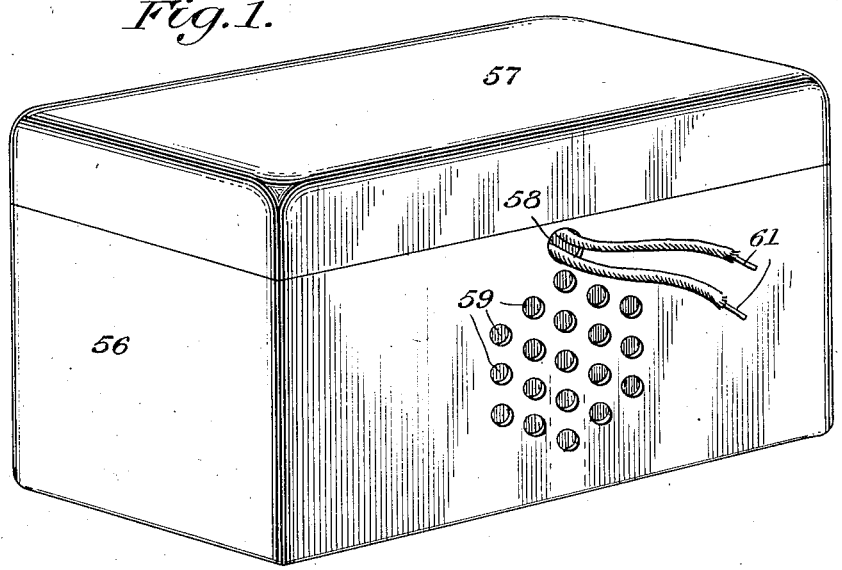
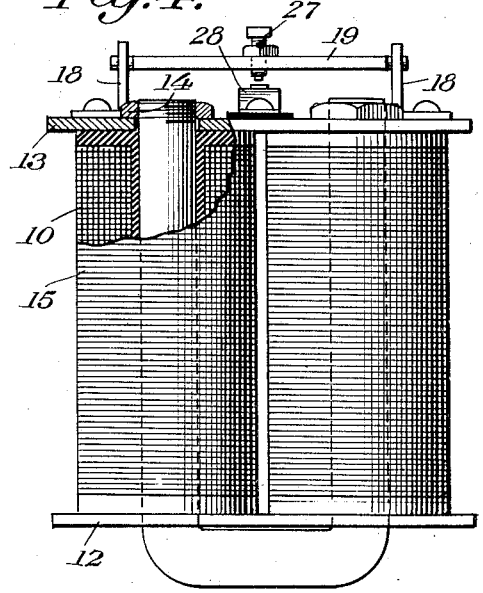
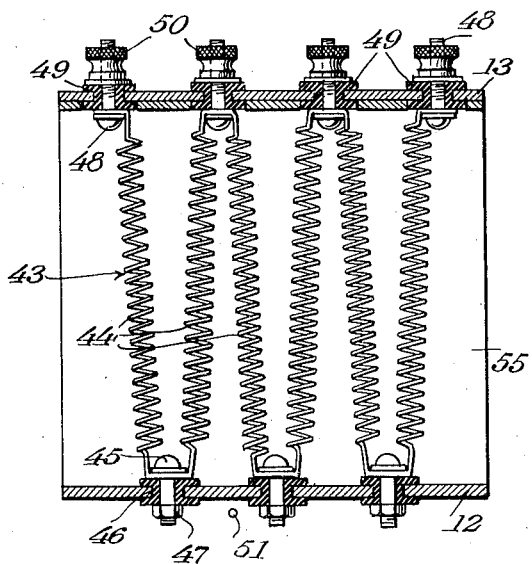
Harold Mitchell
INVENTOR
BY Victor J. Evans & Co.
ATTORNEYS Nov. 10, 1936.    H. MITCHELL    2,060,743
APPARATUS FOR CONTROLLING THE CHARGE OF STORAGE BATTERIES
Filed Nov. 5, 1934    2 Sheets-Sheet 2

Harold Mitchell
INVENTOR
BY Victor J. Evans & Co.
ATTORNEYS

Patented Nov. 10, 1936

2,060,743

UNITED STATES PATENT OFFICE 2,060,743

APPARATUS FOR CONTROLLING THE CHARGE OF STORAGE BATTERIES

Harold Mitchell, Winnipeg, Manitoba, Canada

Application November 5, 1934, Serial No. 751,660

1 Claim. (Cl. 171—229)

The invention relates to electrical devices for automatically controlling the charging of storage batteries.

The principal object of the invention is to provide a device adapted particularly for use on motor vehicles and connected across the generator for controlling the current output to the battery, thereby protecting the battery from damage by overcharging especially while driving on long trips at high speed.

It is well known that if the charging rate of a generator is high damage may result to the storage battery or to the generator particularly when long trips at comparatively high speeds are undertaken. To offset this danger it is a common practice among many motorists to keep their headlights burnings even in the daytime. However, this is but a makeshift and is a matter of guesswork.

To overcome this objection I have devised the present invention which has for an important object the provision of a device which may be adjusted according to the proper voltage of a fully charged battery and which will then automatically reduce the charging rate regardless of circumstances, which will then automatically reduce the charging rate when the voltage of the battery reaches the certain predetermined maximum, and which will permit the normal charging rate to be restored when the dangerous overcharged condition is eliminated.

Another object of the invention is to provide a control device which will eliminate all guesswork on the part of the operator and which will, moreover, enable a motorist to set the generator to charge at a considerably higher rate than is practicable under ordinary circumstances, thereby increasing the efficiency of the battery without danger of overcharging it or damaging the generator, this latter mentioned proposition of increasing the charging rate under normal conditions being of particular value in cold climates where it is requisite that a battery be kept charged to the maximum safe degree in order to insure starting or easy starting at very low temperatures.

Another object of the invention is to provide a device of this character which may be used as standard equipment by manufacturers or which may be attached to an existing car in a short time and without any material alterations in the wiring or in any other part of the electrical apparatus.

An additional object is to provide a device of this character which will be simple and inexpensive to make, assemble and install, rugged in construction so as to be capable of withstanding the shocks and jars incident to travel without detrimental effects, which will be easy to set or adjust, which will be durable in service and also a general improvement in the art.

Figure 3:
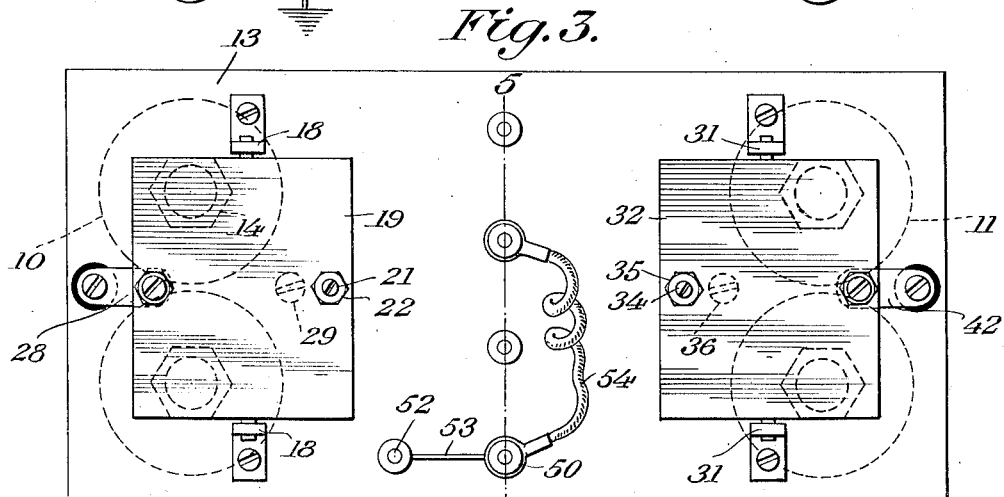
Figure 6:
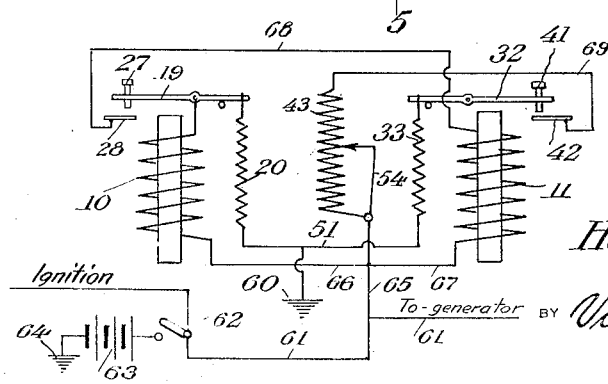

To the attainment of the foregoing and other objects and advantages, the invention preferably consists in the details of construction and the arrangement and combination of parts to be hereinafter more fully described and claimed, and illustrated in the accompanying drawings in which:

Figure 1 is a perspective view showing the casing within which the device is enclosed, Figure 2 is a side elevation of the control device with the casing removed, Figure 3 is a top plan view thereof, Figure 4 is an end elevation with parts broken away and in section, Figure 5 is a vertical cross sectional view taken centrally of the device or on the line 5—5 of Figure 3, Figure 6 is a diagram showing the electrical circuits.

Speaking generally, I have shown the device as comprising a pair of electro-magnetically operated relays appropriately connected in the charging circuit of an automobile, or in fact any other storage battery charging system, and connected with a variable resistance. While the construction may be varied in numerous respects, I have shown the device as comprising, in detail, a pair of electro-magnets 10 and 11 preferably of the horseshoe type, having their legs extending through a base or sub-panel 12 of non-magnetic material and also through a panel 13 having the same characteristics, the ends of the legs projecting beyond or above the panel 13 so as to serve as pole pieces, the ends being represented as carrying nuts 14 which serve to support not only the electro-magnets themselves but also the other parts of the apparatus. In accordance with patent practice it is not necessary to describe the number of turns or the size or the character of the coils 15 and 16 of these respective magnets as such details depend entirely upon the requirements of proper design.

Pivoted at 17 upon brackets 18 rising from the panel 13 is an armature 19 positioned to be attracted by the electro-magnet 10 and it is intended that this armature be so constructed and arranged that under normal conditions it will be unaffected by the magnetic pull exerted by the magnet 10. It will be noted that the armature 19 is pivoted intermediate its ends and that its rear end is pulled downwardly by a coil spring 20 anchored to the sub-panel or base 12 and connected with an adjusting screw 21 which passes freely through the panel 13 and which is adjustably connected with the armature 19 by means of nuts 22. The lower end of the spring 20 is represented as anchored to the base 12 by a screw or bolt 23 which passes through insulating washers 24 and an insulating bushing 25 and which is equipped with a nut 26.

The free end of the armature 19 carries an adjustable contact screw 27 designed to cooperate with a contact 28 mounted upon and insulated from the panel 13. A stop screw 29 may also be provided, rising from the panel 13 and located beneath the armature 19 for the purpose of preventing the contact screw 27 from being moved an excessive distance away from the contact 28 under the influence of the tension spring 20.

Mounted above the electro-magnet 11 and pivoted at 30 between brackets 31 mounted on the panel 13 is an armature 32 which is similarly counterbalanced or held in a normal or neutral position by a tension spring 33 anchored to the base 12 and connected with an adjusting screw 34 passing freely through the panel 13 and adjustably connected with the armature by lock nuts 35, a stop screw 36 being provided beneath the armature for limiting its downward movement under the influence of the spring 33. The lower end of the spring 33 is anchored to the base by means of a bolt 37 which passes through insulating washers 38 and an insulating bushing 39 and which is equipped with a nut 40. The free end of the armature 32 carries an adjustable screw contact 41 adapted to cooperate with a contact 42 mounted upon and insulated from the panel 13.

Located between the two electro-magnets 10 and 11 is a variable resistance indicated as a whole by the numeral 43 and formed of any desired length or number of turns of wire of appropriate resistance material. Figure 5 shows, in detail, the mechanical construction of this variable resistance though it should be understood that there are no particular limitations as to the details. Actually this variable resistance is represented as including a number of stretches 44 of coils anchored at spaced points to the base 12 by bolts 45 which pass through insulating bushings 46 and which are equipped with nuts 47. These coils or stretches of the variable resistance are anchored in a similar manner to the panel 13 by being connected with bolts 48 which pass through insulating bushings 49 and which are equipped with binding nuts 50.

It is intended that the springs 20 and 33 have a common ground connection and I have therefore represented such a connection at 51, this connection being conceivably a strip, a bus bar or, simply, a suitable wire connected with the bolts 23 and 37 by means of the nuts 26 and 40, respectively, thereon. The resistance is intended to be set, in advance, in accordance with the requirements of the particular generator and battery with which the device is used and it is for this reason that the various binding nuts 50 are provided so as to permit this regulation or adjustability by enabling as many as may be desired of the lengths or stretches 44 of resistance coils to be included in the circuit to be described. For convenience, the panel 13 is represented as equipped with a terminal post 52 connected by a conductor 53 with one endmost binding post 50 from which a jumper 54 extends which may be connected with a selected one of the other binding posts 50 so that the amount of resistance may be easily regulated.

It is desirable that the variable resistance 43 be shielded from the electro-magnets, and vice versa, and for this reason I have disclosed an angular metallic member 55, of non-magnetic material, disposed between the resistance and the magnets, it being a convenient matter to anchor this shield in place by means of one or more of the binding posts 50 and also the bolts 23 and 37.

It is also intended that the device be enclosed within a suitable casing 56 of non-magnetic material and having a detachable top 57 permitting access to its interior. This casing is disclosed as having a suitable opening 58 for the passage of the necessary conductors and is also provided with any suitable number of holes 59 for ventilating purposes so as to permit the escape of any heat generate by passage of current through the variable resistance.

The electrical connections are as follows: The conductor 51 is grounded at 60 by being connected with the chassis of the vehicle. Leading from the generator is a wire 61 which leads to the ignition of the car and which is connected either directly or through a switch 62 with the storage battery 63 which has its other terminal grounded at 64. Connected with the wire 61 is a conductor 65 which is connected with a selected one of the bolts 45 which mount the lower ends of the elements of the variable resistance. Also connected with the conductor 65 are conductors 66 and 67, the former of which is connected with one terminal of the electro-magnet 10 and the latter of which is connected with one terminal of the electro-magnet 11. The remaining terminal of the electro-magnet 10 is connected to the armature 19, while the remaining terminal of the electro-magnet 11 is connected by a conductor 68 with the contact 28. Leading from the contact 42 associated with the electro-magnet 11 is a conductor 69 which is connected with the variable resistance 43 at a selected point. The actual electrical connections are disclosed in Figure 6 and as a matter of fact it is immaterial just where and how the binding posts, considered mechanically, are disposed on the panel 13 or on the base 12 as such details can be varied within wide limits, the only requirement being that the connections, diagrammatically considered, be as illustrated in Figure 6.

The device having been constructed as disclosed, the operation is as follows: While the average car battery is called a six volt battery, it is generally known by manufacturers, service men and others that the voltage in a battery does not remain constant while in operation, in that during the process of charging and discharging the voltage fluctuates considerably, varying, as the case may be, from approximately five and one-fourth to seven and one-half volts. It is possible to utilize this factor to effect my purpose. The electro-magnet 10 is connected permanently across the battery and the spring 20 is adjusted to apply sufficient tension to the armature 19 to hold the contact 27 out of engagement with the contact 28. Current will flow from the battery 63, switch 62, conductor 61, conductor 65, conductor 66, through the electro-magnet 10, armature 19, spring 20 and conductor 51 to the ground 60. Adjustment of the spring 20 is such that when the voltage of the battery is normal or sub-normal there will be insufficient strength in the magnet 10 to attract the armature 19. However, as the process of charging the battery continues, in the usual manner, the voltage of the battery will reach full charge or will rise above normal, increasing the strength of the magnet 10 to such a degree that it will attract the armature 19 against the resistance of the spring 20, thereby bringing the contact 27 into engagement with the contact 28. Current will then flow from the battery 63, switch 62, conductor 61, conductor 65, magnet 11, conductor 68, contact 28, contact 27, armature 19, spring 20, and conductor 51, to the ground 60. This will energize the electro-magnet 11 and cause the armature 32 to be attracted against the resistance of the spring 33 so that the contact 41 will be brought into engagement with the contact 42. Current then flows from the generator conductor 61, conductor 65, and will divide, a portion continuing through the magnets 10 and 11 as above described and a portion passing through as much of the variable resistance 43 as is originally connected in the circuit and will pass from the resistance through the conductor 69, contact 42, contact 41, armature 32, spring 33, and conductor 51, to the ground 60. Throwing of the resistance 43 into the circuit in this manner will naturally convert a portion of the electrical energy of the generator into heat which is dissipated into the air and the charging rate of the battery consequently lowered or cut out entirely until the voltage in the battery is lowered to a normal condition whereupon there will be insufficient strength in the electro-magnet 10 to hold the contacts 27 and 28 closed against the pull of the spring 20, and the spring 20 will then disengage the contacts 27 and 28, thereby breaking the circuit through the magnet 11 so that the contacts 41 and 42 will open, resulting in opening the circuit through the resistance. The action is entirely automatic as it is governed by the electro-magnetic switches or relays. It is of course to be understood that the connections to the various points of the variable resistance 43 will depend on various circumstances, such as the condition and type of the battery itself, the generator and in fact the entire electrical system. It will be seen that it is a simple matter to tap in as much or as little of the resistance as may be necessary to meet the requirements of the particular vehicle on which the device is used. It will be clear that by the automatic action brought about there will be no necessity for the operator of a motor vehicle to keep his lights burning when travelling on long trips at high speeds in the daytime and it is equally apparent that there is no guesswork involved as the entire apparatus is responsive to the condition of the battery or the charging system.

By referring now to Figure 2, it will be observed that the electro-magnets 10 and 11 are not identical in their construction. The space between the core 14 of the magnet 10 and the associated armature 19 is considerably greater than that between the core 14 of the electro-magnet 11 and its associated armature 32. The reason for this will be readily apparent when it is understood that the magnet 10 in cooperation with the switch contacts 27 and 28, is designed to act as a pilot control only, and as such the core 14 in practice should be spaced not less than one-fourth inch from the armature 19, otherwise the sensitivity of the control will be impaired.

As a result very little pressure is brought to bear upon the contacts 27 and 28. However as only one-fourth of an ampere of current is required to magnetize coil 11, this construction is satisfactory under actual service conditions.

However with respect to magnet 11, cooperating with the contacts 41 and 42, a different condition exists, the magnet 11 being the control that must supply current to the variable resistance 43 which current may be 10 or 20 amperes. It is necessary that the magnet 11 be extended to within substantially one-sixteenth of an inch of its associated armature 32 in order to close the switch contacts 41 and 42 with considerable pressure to handle the large amount of current passing through the switch. This spacing of the core 14 and armature 32 has been found in actual practice to be critical to insure successful operation.

Another important feature of the invention, disclosed in Figure 2, is that the armatures 19 and 32 are illustrated as being counterbalanced on their respective axis. The purpose of this is to render these armatures, which are the only moving parts, resistant to the necessary vibrations incident to motor vehicle travel.

From the foregoing description and a study of the drawings it is believed that the construction, operation and advantages will be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptabiliy of the device provided such changes constitute no departure from the spirit of the invention or the scope of the claim hereunto appended.

Having thus described the invention, I claim:

In apparatus of the class described, a pair of electro-magnets of the horseshoe type, a pair of spaced non-magnetic plates supporting the magnets, the legs of the magnets projecting through one of the plates to form pole pieces, a plate-like armature for each electro-magnet, brackets pivotally mounting the armatures, the armatures being counterbalanced on their respective axes to resist vibration, coil springs connected to one of the non-magnetic plates and adjustably connected to respective armatures at the rear ends thereof, a switch contact on the front end of each armature, stationary switch contacts on one of the non-magnetic plates adapted to be engaged by the first-named contacts when the associated magnets move the latter to circuit closing position against the tension of their respective controlling springs, a variable resistance comprising a plurality of stretches of wire disposed between and anchored through both plates of non-magnetic material, binding nuts associated with said stretches, a jumper connecting certain of the nuts for permitting a predetermined number of the stretches to be connected in series, a member formed of non-magnetic material disposed between said plates of non-magnetic material and between the magnets and the variable resistance for shielding the variable resistance from the magnets, the exciting coils of both magnets being connected in series, the terminal of one coil being connected to one of said stationary contacts and the terminal of the other coil being connected to the armature associated with the stationary contact just mentioned, both armatures being grounded through their controlling springs, the variable resistance being connected across the other stationary contact and the exciting coils of the magnets, the poles of one of the magnets being spaced a less distance from their associated armature than the poles of the other magnet are spaced from their associated armature, and stop screws on one of the plates of non-magnetic material underneath the armatures for limiting downward movement of the armatures under influence of their controlling springs.

HAROLD MITCHELL.